US010042902B2

(12) United States Patent
Ansari et al.

(10) Patent No.: US 10,042,902 B2
(45) Date of Patent: Aug. 7, 2018

(54) BUSINESS RULES INFLUENCED QUASI-CUBES WITH HIGHER DILIGENCE OF DATA OPTIMIZATION

(71) Applicant: International Business Machines Corporation, Armonk, NY (US)

(72) Inventors: Noor A Ansari, Pune (IN); Ravi Kumar Reddy Kanamatareddy, Hyderabad (IN); Kumar Shourav, Kolkata (JP)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 14/167,451

(22) Filed: Jan. 29, 2014

(65) Prior Publication Data
US 2015/0213098 A1 Jul. 30, 2015

(51) Int. Cl.
G06F 17/30 (2006.01)
(52) U.S. Cl.
CPC .. G06F 17/30557 (2013.01); G06F 17/30289 (2013.01)
(58) Field of Classification Search
CPC ......... G06F 17/30289; G06F 17/30557; G06F 17/30563
See application file for complete search history.

(56) References Cited

U.S. PATENT DOCUMENTS

| | | | | |
|---|---|---|---|---|
| 6,438,537 B1* | 8/2002 | Netz | ................ | G06F 17/30592 707/999.003 |
| 7,756,739 B2* | 7/2010 | D'hers | ............... | G06F 17/30592 705/7.11 |
| 8,533,167 B1* | 9/2013 | Ketkar | ............... | G06F 17/30592 707/600 |
| 8,938,416 B1* | 1/2015 | Cole | ................. | G06F 17/30489 707/607 |
| 2002/0059183 A1* | 5/2002 | Chen | ................ | G06F 17/30398 707/999.001 |
| 2006/0010159 A1* | 1/2006 | Mirchandani | ..... | G06F 17/30592 707/999.102 |
| 2006/0020608 A1* | 1/2006 | D'Hers | ................. | G06Q 40/02 707/999.1 |

(Continued)

FOREIGN PATENT DOCUMENTS

WO    WO 2011/143710    11/2011

OTHER PUBLICATIONS

Paradies, "How to juggle columns: an entropy-based approach for table compression," Aug. 18, 2010, Fourteenth International Database Engineering and Applications Symposium (IDEAS 2010), pp. 205-215.*

(Continued)

*Primary Examiner* — Ashish Thomas
*Assistant Examiner* — Jedidiah P Ferrer
(74) *Attorney, Agent, or Firm* — George R. McGuire; Bond Schoeneck & King, PLLC; John Pivnichny (57) ABSTRACT

The present specification relates to data warehousing, and, more specifically, to systems and methods for optimizing the preparation and use of data cubes (a/k/a quasi-cubes) based on inputs such as particular rules/decisions designed to appropriately size the cubes by effectively removing the static piling of unwarranted dimensions from the each instance/cycle of aggregated schema which are used for neither analysis nor by business intelligence reporting.

10 Claims, 6 Drawing Sheets

(56) References Cited

U.S. PATENT DOCUMENTS

| | | | |
|---|---|---|---|
| 2006/0224473 A1* | 10/2006 | Nelson | G06Q 40/02 |
| | | | 705/30 |
| 2007/0282789 A1* | 12/2007 | Deshpande | G06F 17/30592 |
| | | | 707/999.002 |
| 2008/0288889 A1* | 11/2008 | Hunt | G06Q 30/02 |
| | | | 707/999.101 |
| 2008/0294863 A1* | 11/2008 | Faerber | H03M 7/3084 |
| | | | 711/170 |
| 2010/0010979 A1* | 1/2010 | Garfinkle | G06F 17/30306 |
| 2011/0055146 A1 | 3/2011 | Mahajan | |
| 2011/0282913 A1* | 11/2011 | Kitamura | G06F 17/30654 |
| | | | 707/794 |
| 2013/0166566 A1* | 6/2013 | Lemke | G06F 17/30483 |
| | | | 707/741 |
| 2014/0101201 A1* | 4/2014 | Yan | G06F 17/30592 |
| | | | 707/E17.044 |

OTHER PUBLICATIONS

Golfarelli et al., "The Dimensional Fact Model: A Conceptual Model For Data Warehouses," 1998, International Journal of Cooperative Information Systems (1998), vol. 7, pp. 215-247.*

Barbara, D., Wu, Xintao, Loglinear-Based Quasi Cubes, Journal of Intelligent Information Systems, 2001, phs 255-275, vol. 16.

Lee, D., Reintroducing Usage-Based Optimization in SQL Server 2008 Analysis Services, Published Nov. 18, 2008, Retrieved Aug. 23, 2013.

SSAS-Design Aggregation and Usage Based Optimization, Published Jan. 23, 2013, Retrieved Aug. 23, 2013.

Barbara, D., Sullivan, M., Quasi-Cubes: A Space-Efficient Way to Support Approximate Multidimensional Databases, Feb. 20, 1998.

* cited by examiner

| Date/Time | Dimension 1 | Dimension 2 | Dimension 3 | Dimension 4 | Dimension 5 | Dimension 6 | Dimension 7 | Dimension 8 | Measure 1 | Measure 2 | Measure 3 | Measure 4 |
|---|---|---|---|---|---|---|---|---|---|---|---|---|
| | 5 | 1 | 5 | 0 | 2 | 2 | 1 | 4 | 300,451 | 112,947 | 127,949 | 329,433 |
| | 3 | 2 | 3 | 1 | 4 | 2 | 3 | 1 | 67 | 33 | 2 | 92 |
| | 7 | 5 | 3 | 4 | 4 | 2 | 1 | 5 | 64498 | 32,234 | 25,364 | 19,822 |
| | 5 | 5 | 1 | 6 | 1 | 3 | 4 | 2 | 42,632 | 36,522 | 42,756 | 54,765 |
| | 3 | 2 | 3 | 1 | 2 | 1 | 2 | 3 | 134,184 | 234,287 | 214,872 | 23,468 |
| | 7 | 4 | 3 | 7 | 2 | 4 | 4 | 2 | 356,914 | 232,417 | 623,498 | 235379 |
| | 3 | 2 | 3 | 1 | 5 | 4 | 1 | 5 | 412,134 | 52,091 | 174,314 | 285358 |
| | 3 | 2 | 3 | 1 | 1 | 5 | 1 | 4 | 31 | 47 | 26 | 18 |
| | 6 | 4 | 1 | 3 | 1 | 5 | 2 | 6 | 6,187 | 72,410 | 261,643 | 210,374 |

Fig. 6

| Date/Time | Dimension 1 | Dimension 2 | Dimension 3 | Dimension 4 | Dimension 5 | Dimension 6 | Dimension 7 | Dimension 8 | Measure 1 | Measure 2 | Measure 3 | Measure 4 |
|---|---|---|---|---|---|---|---|---|---|---|---|---|
| | 5 | 1 | 5 | 0 | 2 | 2 | 1 | 4 | 300,451 | 112,947 | 127,949 | 329,433 |
| | 3 | 2 | 3 | 1 | 0 | 0 | 0 | 0 | 546,416 | 472,660 | 38,9214 | 30,8936 |
| | 7 | 5 | 3 | 4 | 4 | 2 | 1 | 5 | 64498 | 32,234 | 25,364 | 19,822 |
| | 5 | 5 | 1 | 6 | 1 | 3 | 4 | 2 | 42,632 | 36,522 | 42,756 | 54,765 |
| | 7 | 4 | 3 | 7 | 2 | 4 | 4 | 2 | 356,914 | 232,417 | 623,498 | 235379 |
| | 6 | 4 | 1 | 3 | 1 | 5 | 2 | 6 | 6,187 | 72,410 | 261,643 | 210,374 |

Fig. 7

BUSINESS RULES INFLUENCED QUASI-CUBES WITH HIGHER DILIGENCE OF DATA OPTIMIZATION

BACKGROUND

The present specification relates to data warehousing, and, more specifically, to systems and methods for optimizing the preparation and use of data cubes (a/k/a quasi-cubes) based on inputs such as particular rules/decisions designed to appropriately size the cubes by effectively removing the static piling of unwarranted dimensions from the each instance/cycle of aggregated schema which are used for neither analysis nor by business intelligence reporting. This is achieved without disturbing the existing systems and design of source and aggregates either by data structure or schema.

As should be understood by those of ordinary skill in the art, enterprise software systems include computer programs with business related applications. These enterprise software systems often store data in data cubes for analytics or analysis reporting. A data cube can be defined as a multi-dimensional data storage and organization structure, which can contain data in aggregated form. The data in a data cube is divided into related groups called dimensions. A common example given to illustrate the dimensions of a data cube includes data related to a product sold by a company. One dimension may include data regarding the product sold, another dimension may include data indicating the purchasing customer, another dimension may include data related to price of the product sold, another dimension may indicate the time the product was sold, another dimension may indicate the location of the store which sold the product, etc. Any single individual dimension may or may not be with a hierarchy of structure and inherent dependencies as designed by business.

The demand is growing on schedule granularity and the wide variety of data classifications among data cubes in enterprise operations. A consequential effect of this demand is the ever increasing operational data sizes and the drudgery of performance in every sphere of data mining activity in an enterprise. For example, the resultant increased cube sizes are affecting the performance of the schedule updates and the cube's refresh (data cubes are susceptible for cumulative increase of storage size as a single refreshed object). Further, there are varied duration requirements of scheduled cube data during reporting (no matter the selection of dimensions and measures is user choice but the recalculations needed to be done effective to selection). The schedule is delivered with one and more cube aggregates as per the business requirements (E.g. daily cube or hourly cube refresh).

There are existing conventional solutions (e.g., so called "quasi-cubes") that attempt to solve the above referenced problem of overwhelming data cube sizes. The existing conventional solutions focus on improving the performance of the data cubes by certain active filtering of cube data while in use and the storage by means of file compressions. The existing conventional solutions, however, have certain negative effects on the performance of the reports, since the filtering or decryption would mean the performance degradation during reporting.

Accordingly, there is a continued need for a method and system for solving the above referenced problem of overwhelming data cube sizes without the negative effects seen with conventional solutions.

SUMMARY

Embodiments of the present invention comprise systems and methods for optimizing the preparation and use of data cubes. These systems and methods can result in the reduction in effective dimensions on the runtime to achieve the reduction in number of records and the optimization of cube size across scheduled updates. In accordance with an embodiment of the present invention, with source aggregates of the complete dimensions available, only the import procedure for preparation of scheduled cubes are filtered against the nullification rules.

According to one embodiment, a computer implemented method comprises the steps of: (i) providing a data cube containing data stored in dimensions with a first configuration; (ii) inputting at least one of master source data, past refreshed cube data, dimension pattern distribution data, business specific driver data, and data cube usage data to a rules/decisions module; (iii) analyzing said at least one of master source data, past refreshed cube data, dimension pattern distribution information, business specific driver data, and data cube usage data by said rules/decisions module; (iv) developing rules and/or decisions based on said step of analyzing by said rules/decisions module; and (v) reconfiguring said data cube to a second configuration based on the application of said rules and/or decisions by said rules/decisions module.

In another implementation, a non-transitory computer-readable storage medium containing program code comprises: (i) program code for inputting at least one of master source data, past refreshed cube data, dimension pattern distribution data, business specific driver data, and data cube usage data to a rules/decisions module; (ii) program code for analyzing said at least one of master source data, past refreshed cube data, dimension pattern distribution information, business specific driver data, and data cube usage data by said rules/decisions module; (iii) program code for developing rules and/or decisions based on said step of analyzing by said rules/decisions module; and (iv) program code for reconfiguring a data cube containing data stored in dimensions in a first configuration to a second configuration based on the application of said rules and/or decisions by said rules/decisions module.

The details of one or more embodiments are described below and in the accompanying drawings. Other objects and advantages of the present invention will in part be obvious, and in part appear hereinafter.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION

As will be described further herein, an embodiment of the present invention addresses the above referenced problems from the point of view of the data knowledge among the produced cubes and the user preferences of reporting. A purpose of an embodiment of the invention is not to reduce the cube sizes, but to reduce the dimensions that create flexibility in reporting use as well as optimization to number of records in star (snow flake) schema, for example, which is achieved without disturbing the existing systems and design of source and aggregates either by data structure or schema. This phenomenon reduces the burden of over sizing of cubes during extended schedules of operational cube refresh scenarios. The purpose of this dimension nullification method is to maintain a) the backward and forward schedule compatibilities of dimensions among the cubes and b) reduction of cube sizes in operation. The dimension nullified cubes thus attributed to quasi-cubes.

Further, another purpose is to retain the model of aggregations schema and the model for cube deployment from the aggregates. It should be "business as usual" for this process without noticing that the changes, indeed, took place only in the record (data) manipulations in the standard structure and length. Stated differently, an embodiment of the present invention is directed to address the problem of over-sizing and reports performance of cube object right in the preparation of the cube input data (external to cube models) by means of aggressive feedback acquired by previously available cube data. That too with seamless data input that preferably modifies neither input data schema nor the cube build model.

One embodiment is directed to a method as an additional capability of the cube data that can visualize one or more of the following: a) The discovery of user preferences and analysis of selection over dimensions against measures in reports; b) Historic analysis on measures against the dimension patterns for quantitative assessment and rating from the previously available cube data; and c) The business references of master data that can differentiate the situations (Ex. peak and off-peak hours, seasons across the business schedules, important dates in the business year, geography affiliations etc.).

Another embodiment is directed to an additional component in the regular data warehouse solution that can trace the above mentioned and transform these to rules and eventually as decisions to i) suppress the dimensions that are less important based on situation for the current aggregation cycle, ii) combine the nullified dimensions along the group among required dimensions as patterns and iii) combine the count of measures arithmetically to reduce the record count. This approach would optimize the preparation of cubes based on the aggregated records. This approach is expected to do the appropriate sizing of cubes that removes the static piling of unwarranted dimensions used by neither analysis nor business intelligence reporting.

As used herein with reference to an embodiment of the present invention, "Dimensions" are the selectable pattern in a given data transformation for more than one ID value for uniqueness. The aggregates can generate multiple records about count of measures based on the granularity of combinational patterns of dimensions. These are represented through the values in terms of IDs managed through the business/master data, and it could be termed as representation of a set property of transactions in business.

"Measures" is count of details of transaction who are the numbers within the pattern of each type as record. Many a number of measures are also combinations of count association to dimensions and their respective patterns. Multiple of measures in the record as combinational use for cubes also increase the number of records.

"Quasi-cubes" is a term that can be used for the derived cubes while dimension nullifications among the aggregated records. These are not the true cubes as the static configurations and design, but the optimized data replenishment by business situations.

As discussed further below and illustrated in the Figures, incoming data for aggregates is graduated to the applied rules for nullifying certain dimensions in the star/snowflake schema based on certain inputs as described herein. The source is already prepared with the additional reference of business inputs that would generate the aggregates for cubes pickup/import procedure/business reporting (i.e., tagged dimensions). The current need recognized by an embodiment of the present invention is to determine which dimension is relevant and otherwise. The rules are derived from various scenarios of: i) Critical observations of report use activities of user from the cubes as a constant update to rule behavior inputs, ii) Quantitative assessment of dimensions versus measures among the history of the previously refreshed cubes, and rule behavior inputs, and iii) The reference details from the source on the data configuration references among business/master data which largely influence the aggregations schedule and frequency of star/snowflake schema based data loads.

The critical inputs for rule based model training to impact the dimension nullification can be done by multifold input procedures on effective validations of data itself. The data being used on reporting or proposed to be used is the basis to extract the inherent intelligence by means of data proposition through an external embodiment called stochastic procedures.

The usage dynamics of dimensions is captured while reporting configurations of user behaviors on report alignments. The cube usage portal/server/process can capture these usage behaviors from single/multiple/business hierarchy of users and perform the best possible usage behavior on the given cube which can be specific for business purpose.

The available schedules of operational/active cubes in the cube database can provide larger insights about the filtered dimensions that may already be in use and the pattern of dimensional records in the cube data. The schedule of study against the data profiles can be decided by operational constraints/business decisions/socialistic models.

The superseding phenomenon on above two procedures on cube data (stochastic data rationale and user selection behaviors on reports) is provided from a business reference which can bypass the decision by above two procedures to a compulsion on a dimension to be mandatory cube data based on schedules/business rationale/dimension importance.

The proposed inputs as rule decisions to aggregate schedule on basis of time preferably does not change either the schema of various aggregates or the model applied to cube refresh, which means that there are no structure changes in the way data is processed between star/snowflake schema and cube models. But, the dimensions are devalued based on the relevance to nullify the ID population. This would affect the reduction in number of records and regrouping of dimension patterns among the measures composition.

A module, as discussed herein, can include, among other things, the identification of specific functionality represented by specific computer software code of a software program. A software program may contain code representing one or more modules, and the code representing a particular module can be represented by consecutive or non-consecutive lines of code.

Figure 1:
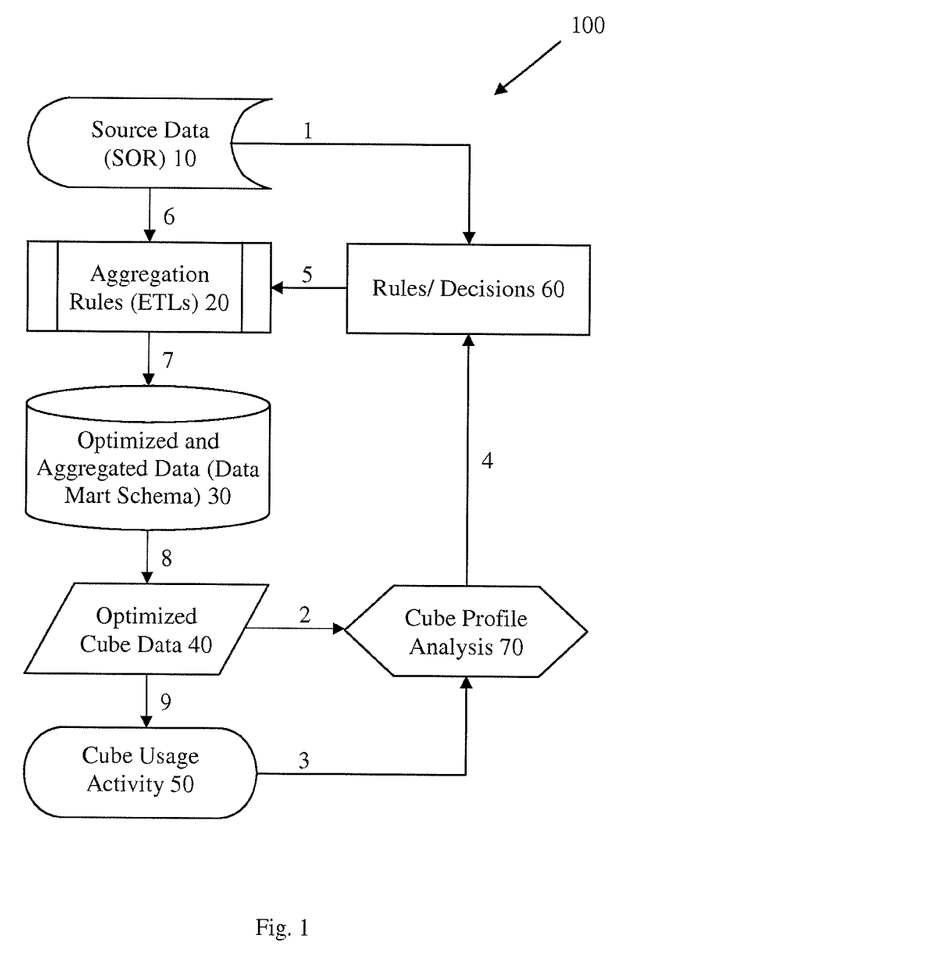
FIG. 1 is a schematic representation of a method and system for optimizing the preparation and use of data cubes according to one embodiment.

Referring now to the drawings, wherein like reference numerals refer to like parts throughout, there is seen in FIG. 1 a schematic representation of a method and system 100 for optimizing the preparation and use of data cubes according to one embodiment. Source Data (SOR) module 10, Aggregation Routines (ETLs) module 20, Optimized and Aggregated Data (DDS/Data Mart Schema) 30, Optimized Cube Data module 40, Cube Usage Activity module 50, Rules/Decisions engine/module 60 and Cube Profile Analysis module 70 are shown with various arrows between these components to illustrate the flow of data or other actions as described herein. FIG. 1 relates to Method A (see, e.g., the placement of arrow 5), as further described below. Methods A and B regarding the situs of applied nullifications from the Rules/Decisions Engine/Module 60 is described in further detail with reference to FIGS. 2-5 and Tables 1-3 below.

Arrow no. 1 is shown between Source Data (SOR) 10 and Rules/Decisions engine/module 60. Arrow no. 1 indicates the import of master data from Source Data (SOR) 10 to Rules/Decisions 60, such import of master data being referred to changes in configuration of data sources in terms of business properties. Rules/Decisions engine/module 60 is structured, connected, and or programmed to decide the optimization requirements in effective use of dimensions based on business policy situation, an effective input to rule authoring (e.g., peak and off-peak hours, seasons across the business schedules, important dates in the business year, geography affiliations etc.).

Arrow no. 2 is shown between Optimized Cube Data 40 and Cube Profile Analysis module 70. Arrow no. 2 indicates the flow of previously refreshed cube data from Optimized Cube Data 40 to the Cube Profile Analysis module 70. The Cube Profile Analysis module 70 is structured, connected, and or programmed to collect this previously refreshed cube data and to perform quantitative assessment of previously refreshed cube data for capturing the relevance of comparatives between dimensions and measures. The past refreshed cubes enabled data "has an interesting story to tell," and can be assessed for largest measures and dimension patterns against these counts. The dimension pattern distribution information is collected by the Cube Profile Analysis module 70 (e.g., the distribution of larger, medium and lowest composition of measures against dimension patterns).

Arrow no. 3 is shown between Cube Usage Activity module 50 and Cube Profile Analysis module 70. Cube Usage Activity module 50 is structured, connected, and or programmed to collect and contain user behavior details of actions about selections of dimensions against measures among various cube identities. Cube Usage Activity module 50 is further structured, connected, and or programmed to determine the real use of concentration by users in selecting dimensions and measures in the front-end. Arrow no. 3 indicates the flow of quantification and averages among the captured details from the Cube Usage Activity module 50 to the Cube Profile Analysis module 70 (e.g., details of how the end user applying the dynamic placement of dimensions and measures on analysis front-end).

Arrow no. 4 is shown between Cube Profile Analysis module 70 and Rules/Decisions engine/module 60. Arrow no. 4 indicates the flow of information contained in and generated by the Cube Profile Analysis module 70 (described above) to the Rules/Decisions engine/module 60. Based in part on this information, and in part on the information received by arrow no. 1, Rules/Decisions engine/module 60 is structured, connected, and or programmed to build the required configurations to rule authoring and the decision mechanism based on certain "critical inputs" described herein.

Arrow no. 5 is shown between Rules/Decisions engine/module 60 and Aggregation Routines (ETLs) module 20. Arrow no. 5 indicates that rules/decisions are applied by the Rules/Decisions engine/module 60 for required reconfigurations on demand to the scheduled aggregations activities through ETL jobs at the Aggregation Routines (ETLs) module 20.

Arrow no. 6 is shown between Source Data (SOR) 10 and Aggregation Routines (ETLs) module 20. Arrow no. 6 indicates the flow of source data from Source Data (SOR) 10 to the Aggregation Routines (ETLs) module 20. The Aggregation Routines (ETLs) module 20 is structured, connected, and or programmed to collect and access this source data at aggregation for preparation of records that hold dimensions and measures. This is preferably a scheduled activity in a data warehouse and influenced by the new element called application of rules received from the Rules/Decisions engine/module 60 at arrow no. 5 preferably during every aggregation activity. The main input to aggregation logic within Aggregation Routines (ETLs) module 20 is to identify the nullified dimensions without losing the measure count. Group records with the unique pattern after the nullification of certain dimensions among a single record with totaling the count of measures. When a dimension/particular record is nullified, the new emergence of the dimension pattern would match to some of the existing. Since the matching other dimension pattern is available, the measures available against pre-filtered record needs to be automatically added to total, because these measure in reality do exist.

Arrow no. 7 is shown between Aggregation Routines (ETLs) module 20 and Optimized and Aggregated Data (DDS/Data Mart Schema) 30. Arrow no. 7 indicates the population of aggregates to Optimized and Aggregated Data (DDS/Data Mart Schema) 30 database in the designed schema from the Aggregation Routines (ETLs) module 20.

Arrow no. 8 is shown between Optimized and Aggregated Data (DDS/Data Mart Schema) 30 and Optimized Cube Data module 40. Arrow no. 8 indicates the connection of Optimized Cube Data module 40, which is a cube building model, with different schema tables within Optimized and Aggregated Data (DDS/Data Mart Schema) 30 for different cube data preparations.

Arrow no. 9 is shown between Optimized Cube Data module 40 and Cube Usage Activity module 50. Arrow no. 9 indicates the flow of cube data usage information by the end user on the front-end for selective computations based on permissible dimensions and measured based on time duration by the Cube Usage Activity module 50.

Figure 2:
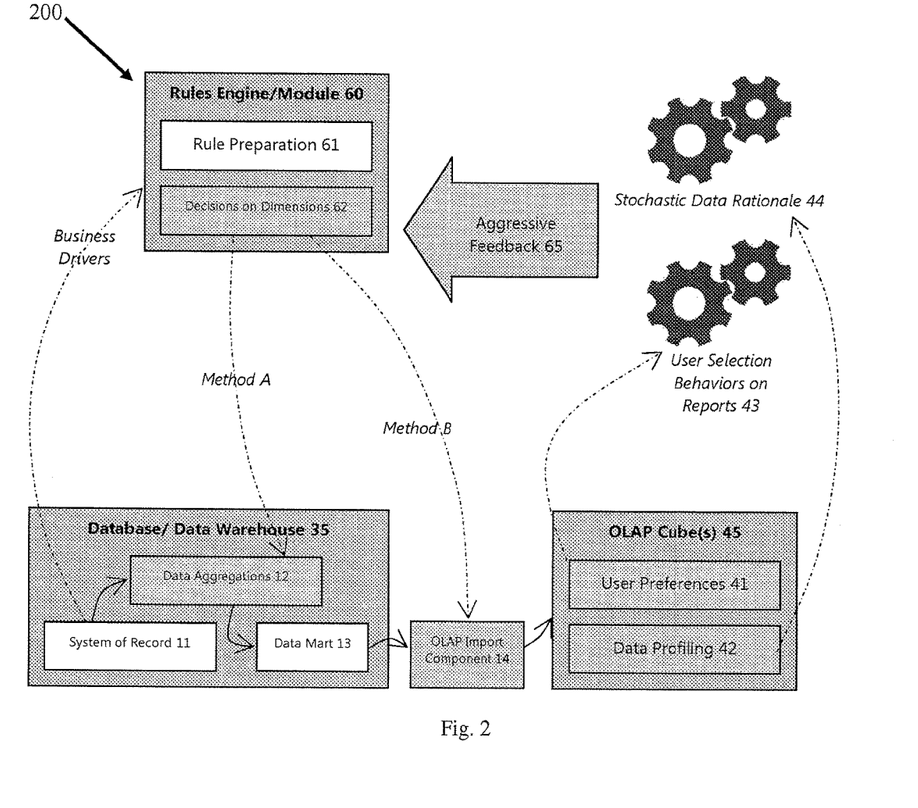
FIG. 2 is a schematic representation of a method and system for optimizing the preparation and use of data cubes (showing activities of dimension optimization for Quasi-cubes) according to an additional embodiment.

Turning to FIG. 2, a schematic representation of a method and system 200 for optimizing the preparation and use of data cubes (showing activities of dimension optimization for Quasi-cubes) according to one embodiment is shown. A purpose and orientation of quasi-cubes according to an embodiment of the present invention is to reduce the number of records among pickup aggregated data that are influenced by filtered dimension values. It is suggested to use absolutely critical dimensions for reduction of OLAP database sizes. In order to reduce OLAP database sizes, "critical" dimensions should be determined and used as described herein.

The OLAP cube 45 is a central component in the system for optimizing the preparation and use of data cubes, as shown in FIG. 2. This central component is where other computations are surrounded as supporting systems. The OLAP reporting tools (see "reporting configurations of user behaviors on report alignments" discussion above) also extend to capture preferred usage of dimensions by numerous users, and the prepared data in the previous OLAP database 35 for each cube 45 can be statistically assessed (see "larger insights" discussion above) for better dimension profiles.

User preferences module 41 acts as the live usage capture from the User Selection Behaviors on Reports 43 with reference to active dimension usage. This module details the user behaviors against the significance of important dimensions and summarizes the actively used dimensions in design from varied cubes by reports interaction. Data profiling module 42 performs data profiling using appropriate Stochastic Data Rationale 44 to study the population details among the previously presented dimension records in OLAP database. The data records can be assessed, for example, based on some statistical routines (e.g. ANOVA, hypothesis testing etc.) on the basis of population data. And there could be models built for exclusive purpose of this optimization, which gets trained from either fullest records or sample records. The sampling again can be another statistical routine for the defined model. The Stochastic Data Rationale 44 rationalizes the User Selection Behaviors on Reports 43 about randomized observations, and also the dimensions and measure profiles among the current cubes.

Aggressive feedback 65 is the composite outcome of the "reporting configurations of user behaviors on report alignments" and "larger insights" discussions above. In essence, Aggressive feedback 65 is an intelligence assisted component which should not only persist with the previous intelligence of the system but also re-profile the use of current/applicable intelligence. In the process of an embodiment of the present invention, the intelligence is up to data for last cycle of OLAP Cubes profiling. On the other side of the Rules/Engine Module 60, the 'Business Drivers/Indicators' from the source reference data can also enforce certain dimensions that can be necessary, overlooking the intelligence provided through 'Aggressive Feedback' 65 (E.g. important dates, business specific indicators etc.). The 'Business Drivers/Indicators' are preferably considered supreme to other feedback, and overrides the dimensions availability for upcoming Data Aggregations 12 or OLAP Import Component 14 (to be discussed with respect to Methods A and B, respectively, below).

Rules Engine/Module 60 prepares and includes the rules, which can be based on the 'Aggressive Feedback' 65 about the dimensions that are in use with multiple cubes 45 in OLAP Database 35. An embodiment of the present invention recognizes that in a typical business scenario, there could be many cubes 45 that are operational, and all of them having different optimization mechanisms as described through this disclosure. Each cube can be independent on its own.

Subsequently, the decisions of the Rules Engine/Module 60 can be associated which would work with other performing components of Data Aggregations 12 or OLAP Import Component 14. This is a unique embodiment for this disclosure, and deals with the data preparation methods by duly identifying the dimensions to be nullified and measurable count of sum among the major dimension pattern. The subcomponents of Rules Engine/Module 60 include two variants of Rule Preparation 61 and Decisions of Dimensions 62.

Data Aggregations 12 has an interface to System of Record 11 (which is the normalized source data from different business systems for purpose of data warehouses), while preparing the selective/designed aggregates and posting to Data Mart 13 (stores aggregates in terms of dimensions and measures, which are prepared from the System of Record 11; the procedures of aggregations are schema driven and this disclosure does not propose for any changes either in the Data Mart/Star schema or the OLAP data structure). This is a regular practice in most data warehouses, as should be understood by those of skill in the art, except the use of dimension nullification/optimization methods proposed herein.

The OLAP Import Component 14 has an interface to Data Mart 13, while preparing the aggregates to be filtered and posted to OLAP Cubes 45. This is a regular practice in most data warehouses, as should be understood by those of skill in the art, except the use of dimension nullification/optimization methods proposed herein.

Methods A and B regarding the situs of applied nullifications from the Rules Engine/Module (which will be described in further detail with reference to Tables below) will now be described with reference to FIG. 2.

Method A illustrates the applied nullifications of dimensions at Data Aggregations 12 while preparing the data aggregations to Data Mart 13. The filtered data available at the Data Mart 13 is a direct input to OLAP Cubes 45 through OLAP Import Component 14. This is a relatively restricted approach (as compared to Method B) where the dimension data against the original design is preferably never seen or revoked for any analysis, if needed in the future. Any one method is imposed on the dimension nullification based on the data integrity needs of business enterprise. For example, Method A: works on aggregate procedure from sources which is permanent of star schema, the actual dimensions of the original aggregates without filtering is never seen. For cubes it is a simple import procedure. For Method B (described further below): the star schema is updated with the dimensions as it is, without nullifications. The import procedure for cubes would do that job before updating the OLAP database.

Method B illustrates the applied nullifications of dimensions at OLAP Import Component 14 while importing data aggregations to OLAP Cubes 45. The aggregates available at the Data Mart 13 are filtered to OLAP Cubes 45 by OLAP Import Component 14. This is an approach that can be most viable where the dimension data against the original design is intact for any analysis, if needed in the future. Any one method (see Method A and B descriptions above) can be imposed on the dimension nullification based on the data integrity needs of business enterprise and no dual or composed use is possible.

Tables 1-3 show a sample aggregation output based on Methods A or B, described above.

Table 1 represents original data in star/snowflake schema in example bellow.

TABLE 1

| Date/Time | Dimension 1 | Dimension 2 | Dimension 3 | Dimension 4 | Dimension 5 | Dimension 6 | Dimension 7 | Dimension 8 | Measure 1 | Measure 2 | Measure 3 | Measure 4 |
|---|---|---|---|---|---|---|---|---|---|---|---|---|
| | 5 | 1 | 5 | 0 | 2 | 2 | 1 | 4 | 300,451 | 112,947 | 127,949 | 329,433 |
| | 3 | 2 | 3 | 1 | 4 | 2 | 3 | 1 | 67 | 33 | 2 | 92 |
| | 7 | 5 | 3 | 4 | 4 | 2 | 1 | 5 | 64498 | 32,234 | 25,364 | 19,822 |
| | 5 | 5 | 1 | 6 | 1 | 3 | 4 | 2 | 42,632 | 36,522 | 42,756 | 54,765 |
| | 3 | 2 | 3 | 1 | 2 | 1 | 2 | 3 | 134,184 | 234,287 | 214,872 | 23,468 |
| | 7 | 4 | 3 | 7 | 2 | 4 | 4 | 2 | 356,914 | 232,417 | 623,498 | 235379 |
| | 3 | 2 | 3 | 1 | 5 | 4 | 1 | 5 | 412,134 | 52,091 | 174,314 | 285358 |
| | 3 | 2 | 3 | 1 | 1 | 5 | 1 | 4 | 31 | 47 | 26 | 18 |
| | 6 | 4 | 1 | 3 | 1 | 5 | 2 | 6 | 6,187 | 72,410 | 261,643 | 210,374 |

The first column is for date/time, followed by columns for Dimensions 1-8, and Measures 1-4. The numbers within the Dimension columns represent some value/classification given by a business to its collected data. For example, certain ages can have the following dimensions—1-10="1"; 10-15="2"; 15-18="3"; 19-25="4" 26-35="5"; 36-44="6"; and 45-50="7". Note, dimension values in the column for Dimension 1 can, and probably will, represent different values for Dimension 2, for example. The ultimate computations are set forth in the columns with the Measures.

Figure 6:
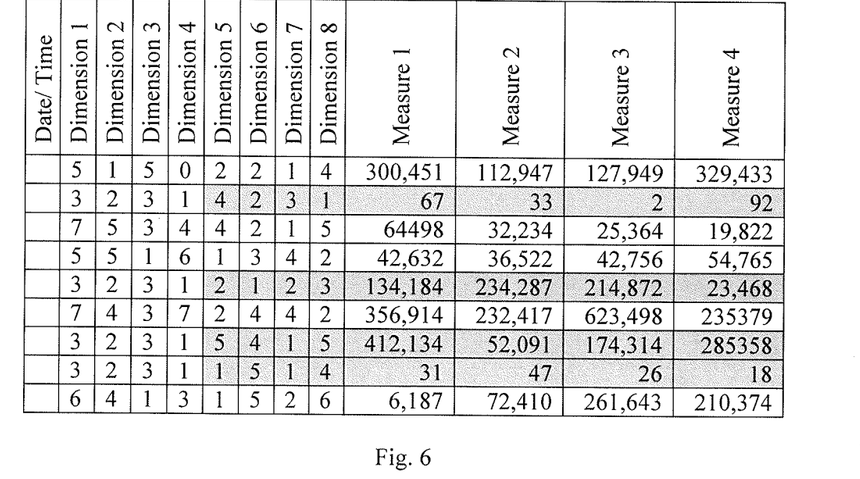
FIG. 6 is a table showing where Rules/Decisions are applied by a Rules Engine/Module, according to an additional embodiment.

FIG. 6 shows where the Rules/Decisions are applied by the Rules Engine/Module 60. The highlighted dimensions are indicated as the dimensions that are going to be nullified based on input (as discussed above, and can be variable) to the Rules Engine/Module 60 in consequential to the above example (Table 1).

Figure 7:
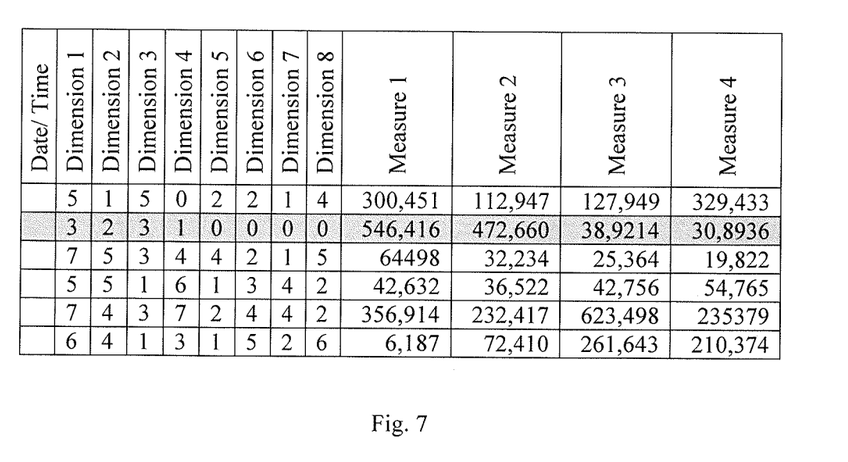
FIG. 7 is a table showing optimized dimensions and corresponding measures, according to an additional embodiment.

FIG. 7 shows the optimized dimensions and corresponding measures. The highlighted dimensions to be nullified, as shown in FIG. 6, are merged and nullified based on the Rules/Decisions applied by the Rules Engine/Module 60 as shown in the highlighted row in FIG. 7 (null values, see "0s"). These can essentially be the dimensions that are not being used by the business users (input to the Rules Engine/Module 60) at a certain point in time. The highlighted Measures in FIG. 6 are added as shown in FIG. 7, and are never lost. The Measures can indicate, for example, number of products sold, price numbers etc. The above example of the table schema (Table 1), meant to be the aggregate representation to cubes, is processed to get identified for less significance in the dimension rationale [0052] and nullified in the dimension columns. The following table is the example of output from the above (Table 1) and (FIG. 6) in process of achieving the record merger to major dimension pattern among records.

Figure 3:
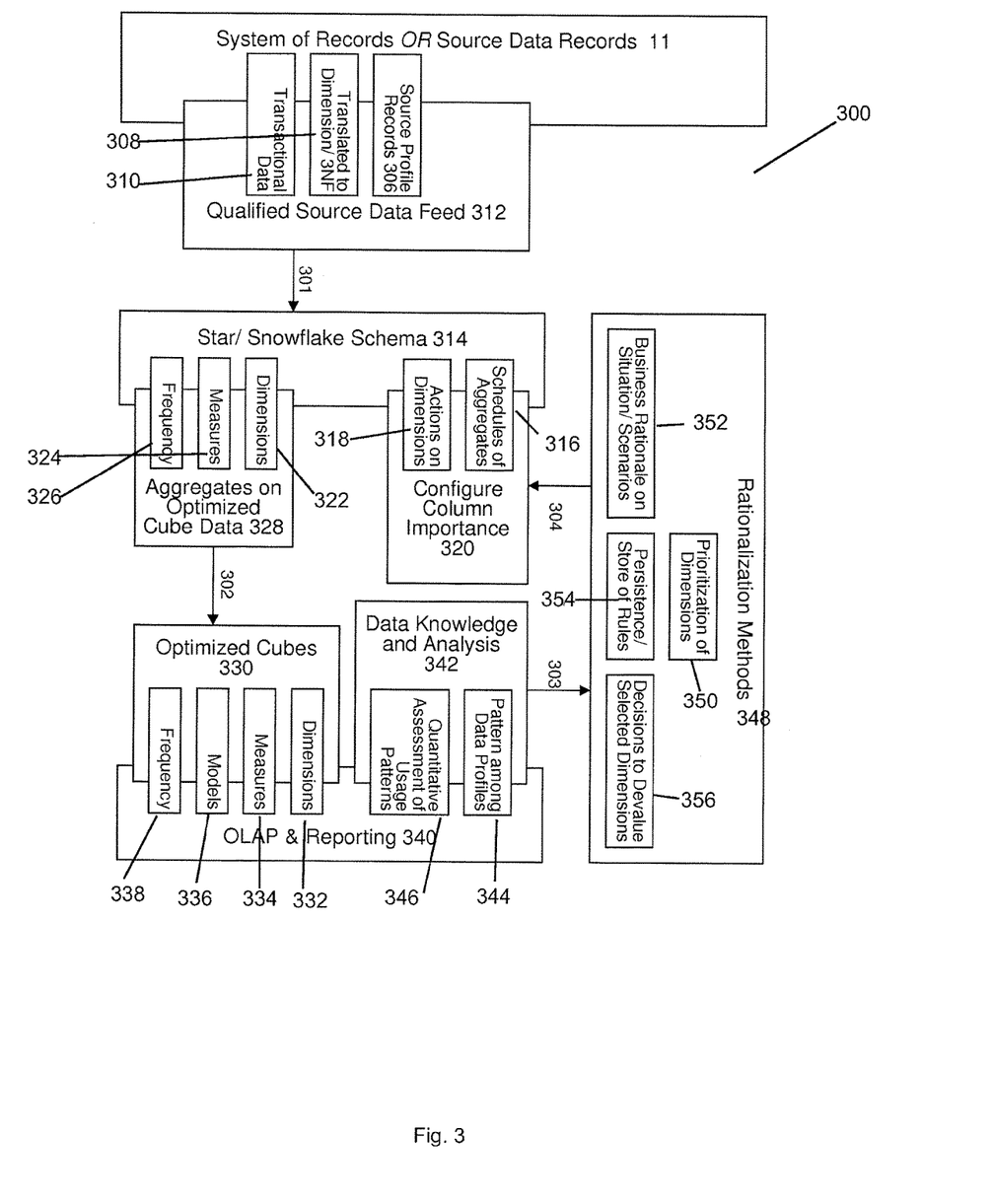
FIG. 3 is a schematic representation of a method and system for optimizing the preparation and use of data cubes (showing activities of dimension optimization for Quasi-cubes) according to an additional embodiment.
Figure 4:
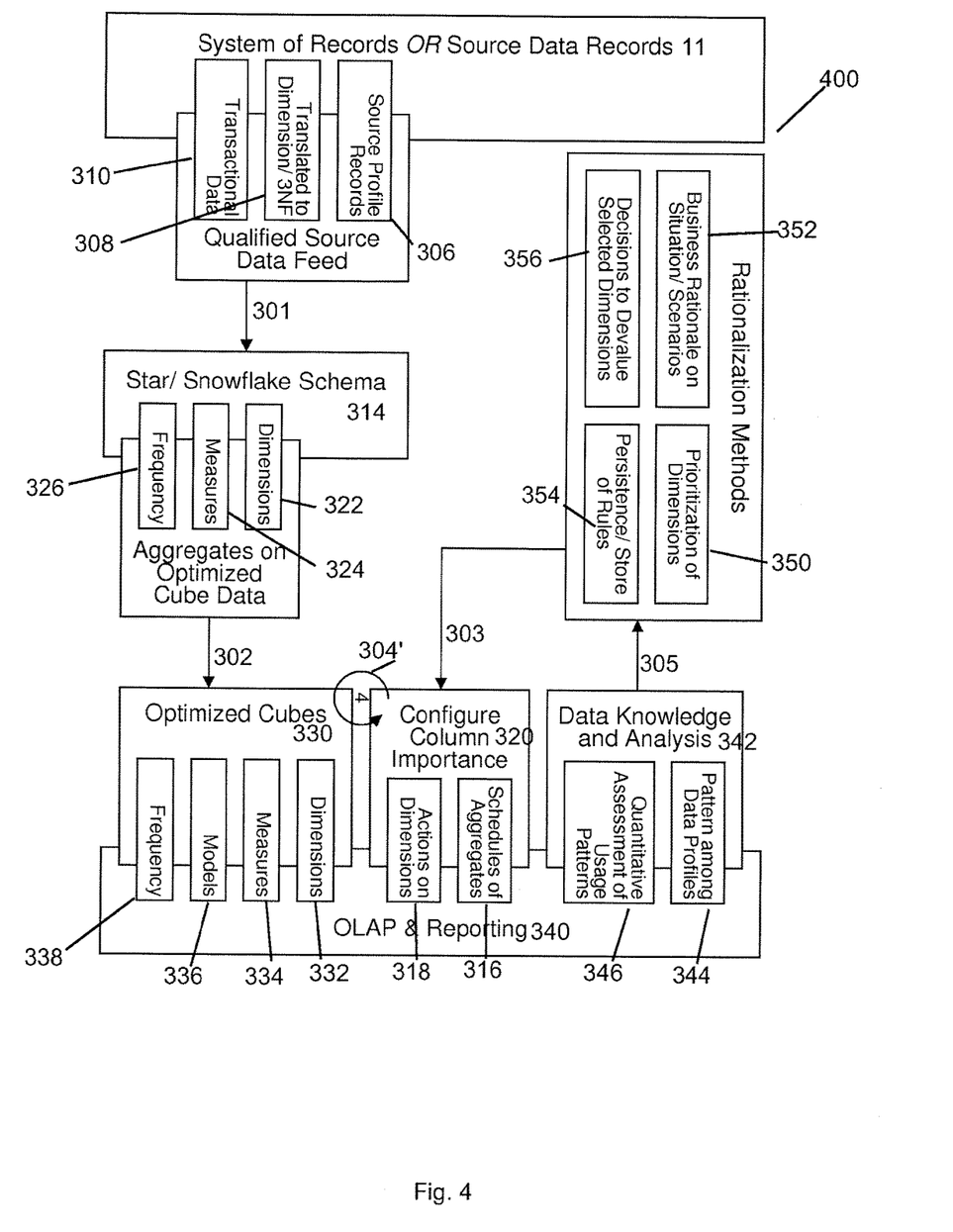
FIG. 4 is a schematic representation of a method and system for optimizing the preparation and use of data cubes (showing activities of dimension optimization for Quasi-cubes) according to an additional embodiment.

Turning to FIG. 3, a schematic representation of a method and system 300 for optimizing the preparation and use of data cubes (showing activities of dimension optimization for Quasi-cubes) is shown according to an additional embodiment. FIG. 3 relates to a further description/illustration of Method A, and shows the rules for dimension nullifications applied during preparations of aggregates stage star/snowflake schema. The aggregates are in optimized form and may not provide any data integrity check directly to sources (System of Records). FIGS. 3 and 4 (described further below) show various modules, components, method steps, and/or flows of data/information/instructions similar to (and sometimes, in more detail as compared to) FIG. 2.

System of record or source of data record 11 is similar to system of record 11 in FIG. 2. A source profile records 306, translated to dimension/3NF 308, translational data 310 and qualified source data feed 312 are also shown. Arrow 301 shows the flow of data/information/instructions from the qualified source data feed 312 to the star/snowflake schema 314 (which can be within database/data warehouse 35 along with the system of record or source of data record 11, as shown in FIG. 2). The star/snowflake schema 314 is shown with the schedule of aggregates 316, action on dimensions 318 and configure column importance 320, along with dimensions 322, measures 324, frequency 326, and aggregates on optimized cube data 328.

Arrow 302 shows the flow of data/information/instructions from the aggregates on optimized cube data 328 to the optimized cubes 330 (similar to OLAP cube 45 in FIG. 2). The optimized cubes 330 are shown with dimensions 332, measures 334, models 336, frequency 338, and OLAP & reporting 340, along with data knowledge and analysis 342, pattern among data profiles 344 and quantitative assessment of usage patterns 346.

Arrow 303 shows the flow of data/information/instructions from the data knowledge and analysis 342 to rationalization methods 348 (which can be within rules engine/module 60, as shown in FIG. 2). Rationalization methods 348 are shown with prioritization of dimensions 350, business rationale on situation/scenarios 352, persistence/store of rules, and decisions to devalue selected dimensions 356.

Arrow 304 shows the flow of data/information/instructions from the rationalization methods 348 to the configure column importance 320.

In use, system of records 11 are normalized to the level required (e.g., 2 or 3 Normal Form). The processing of these records can make sure that the scheduled aggregates are supported. star/snowflake schema 314 can be influenced by configure column importance 320 for nullification of dimensions in the output records (which is the recipient of data/information/instructions from rationalization methods 348 per arrow 304). These records can become the direct input to scheduled OLAP & reporting 340 data imports. In each cycle of OLAP & reporting 340 updates, secondary functions can be invoked to acquire data knowledge and analysis 342. Rationalization methods 348 can generate the decision outcome from discovery and acquisition of knowledge about cube usage etc. (through arrow 303). The decisions can be about and can influence the nullification of dimensions.

Turning to FIG. 4, a schematic representation of a method and system 400 for optimizing the preparation and use of data cubes (showing activities of dimension optimization for Quasi-cubes) is shown according to an additional embodiment. FIG. 4 relates to a further description/illustration of Method B, and shows the rules for dimension nullifications are applied to cube data while import procedure to OLAP. This method maintains the aggregates star/snowflake schema intact as original design, which in turn may be made available for other reporting requirements in its original form.

The set up of FIG. 4 is similar in some ways to FIG. 3, and different in other ways. The similarities have been described above, and the differences will now be described. Schedule of aggregates 316, action on dimensions 318 and configure column importance 320 is shown with OLAP & reporting 340, instead of with star/snowflake schema 314. Arrow 303 shows the flow of data/information/instructions from the rationalization methods 348 to the configure column importance 320. Arrow 304' shows the flow of data/information/instructions from the configure column importance 320 to the optimized cubes 330 and back to the configure column importance 320. Arrow 305 shows the flow of data/information/instructions from the data knowledge and analysis 342 to the rationalization methods 348.

In use, system of records 11 are normalized to the level required (e.g., 2 or 3 Normal Form). System of records 11 provided source data that is aggregated/stored as per the original design at star/snowflake schema 314, and that can be the scheduled source data for 'OLAP & Reporting 340. The latest rules from 'Rationalization Methods 348 are acquired, and are performed from the previous cycle of Optimized Cubes 330. Taking the aggregation from star/snowflake schema 314 as source data, the records are parsed at OLAP & Reporting 340 for dimension nullification while the cube refresh/import. In each cycle of OLAP & Reporting 340 updates, secondary functions can be invoked to acquire Data Knowledge and Analysis 342.

Figure 5:
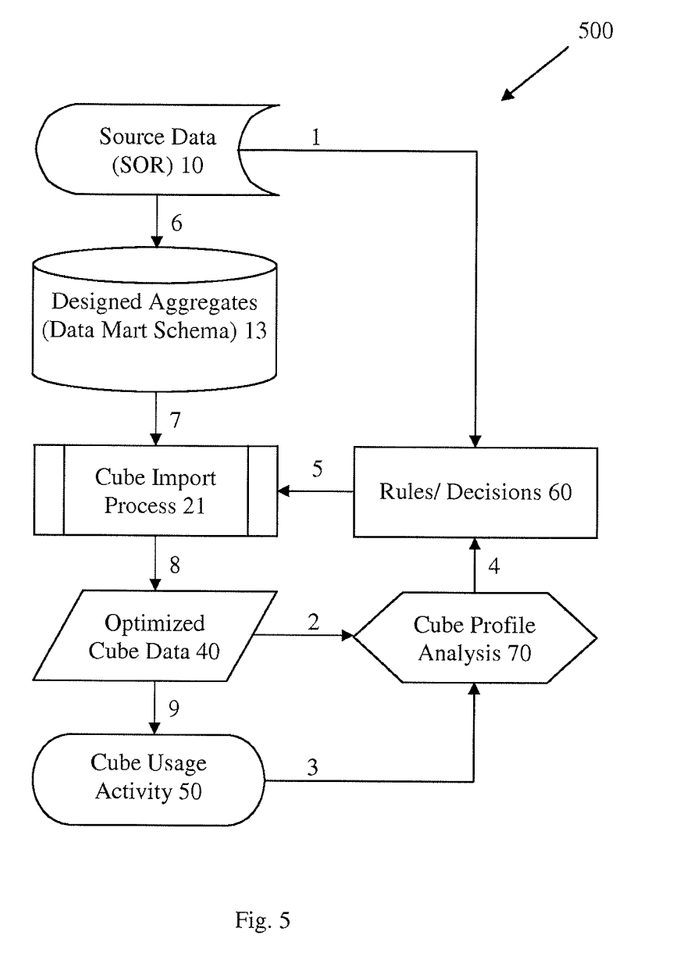
FIG. 5 is a schematic representation of a method and system for optimizing the preparation and use of data cubes (showing activities of dimension optimization for Quasi-cubes) according to an additional embodiment.

FIG. 5 is a schematic representation of a method and system for optimizing the preparation and use of data cubes (showing activities of dimension optimization for Quasi-cubes) according to an additional embodiment. FIG. 5 is similar to FIG. 1, however, FIG. 5 relates to Method B, as described herein. In particular, arrow 5 shows the flow of information and/or instructions from Rules/Decisions 60 to Cube Import Process 21. Arrow 6 shows the flow of information and/or instructions to Designed Aggregates (Data Mart Schema) 13, arrow 7 shows the flow of information and/or instructions from Designed Aggregates (Data Mart Schema) 13 to Cube Import Process 21, and arrow 8 shows the flow of information and/or instructions from Cube Import Process 21 to Optimized Cube Data 40.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment or an embodiment combining software and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present invention has been described in connection with a preferred embodiment, it should be understood that modifications, alterations, and additions can be made to the invention without departing from the scope of the invention as defined by the claims.

What is claimed is:

1. A computer implemented method for optimizing the preparation and use of a plurality of data cubes, the method comprising:

providing a first data cube containing data stored in dimensions with a first configuration;

inputting master source data, past refreshed cube data, dimension pattern distribution data, business specific driver data, and feedback about preferred usage of one or more dimensions by one or more users to a rules/decisions module;

analyzing said master source data, past refreshed cube data, dimension pattern distribution information, business specific driver data, and said feedback by said rules/decisions module;

developing, by said rules/decision module, rules and/or decisions based on said master source data, said past refreshed cube data, said dimension pattern distribution information, said business specific driver data, and said feedback, wherein the developed rules/decisions are also based on at least information about prioritization of dimensions, information about one or more business rationales, and information about devaluing one or more dimensions, and wherein the rules/decision module is configured to prioritize business specific driver data over said feedback when developing rules and/or decisions;

reconfiguring said first data cube to a second configuration based on the application of said rules and/or decisions by said rules/decisions module, wherein the step of reconfiguring further comprises the steps of:
identifying a plurality of dimensions to be nullified, wherein each dimension is represented by at least one numeral, wherein the same numeral represents different values between at least two of the plurality of dimensions, and wherein each dimension of the plurality of dimensions is associated with a separate corresponding measure, wherein at least one separate corresponding measure is a different value from that of at least one other separate corresponding measure;
merging and nullifying the identified dimensions to be nullified, wherein the step of nullifying does not change data schema or data structure of the first data cube; and
adding each of the corresponding measures and associating the corresponding measures with the merged and nullified identified dimensions; and reconfiguring a second data cube from a first configuration to a second configuration based on the application of said rules and/or decisions by said rules/decisions module, wherein the reconfiguration of the second data cube from a first configuration to a second configuration is different than the reconfiguration of the first data cube from a first configuration to a second configuration.

2. The method of claim 1, wherein said data cube usage data comprises actively used dimensions of said data cube at a particular point in time.

3. The method of claim 1, wherein said business specific driver data includes data selected from the group consisting of peak hours data, off-peak hours data, particular dates data, particular days of the week data, holiday data, and business location data.

4. The method of claim 1, wherein the identified dimensions are nullified while data aggregations are prepared and provided to a data mart within a data warehouse.

5. The method of claim 1, wherein the identified dimensions are nullified while data aggregations are imported to said data cube outside of a data mart within a data warehouse.

6. A non-transitory computer-readable storage medium containing program code comprising:
program code for inputting master source data, past refreshed cube data, dimension pattern distribution data, business specific driver data, and feedback about preferred usage of one or more dimensions by one or more users to a rules/decisions module;
program code for analyzing said master source data, past refreshed cube data, dimension pattern distribution information, business specific driver data, and feedback about preferred usage of one or more dimensions by one or more users by said rules/decisions module;
program code for developing, by said rules/decisions module, rules and/or decisions based on said master source data, said past refreshed cube data, said dimension pattern distribution information, said business specific driver data, and said feedback, wherein the developed rules/decisions are also based on at least information about prioritization of dimensions, information about one or more business rationales, and information about devaluing one or more dimensions, and wherein the rules/decision module is configured to prioritize business specific driver data over said feedback when developing rules and/or decisions;
program code for reconfiguring a first data cube containing data stored in dimensions in a first configuration to a second configuration based on the application of said rules and/or decisions by said rules/decisions module, wherein the program code for reconfiguring further comprises program code for:
identifying a plurality of dimensions to be nullified, wherein each dimension is represented by at least one numeral, wherein the same numeral represents different values between at least two of the plurality of dimensions, and wherein each dimension of the plurality of dimensions is associated with a separate corresponding measure, wherein at least one separate corresponding measure is a different value from that of at least one other separate corresponding measure;
merging and nullifying the identified dimensions to be nullified, wherein the step of nullifying does not change data schema or data structure of the first data cube; and
adding each of the corresponding measures and associating the corresponding measures with the merged and nullified identified dimensions; and
program code for reconfiguring a second data cube from a first configuration to a second configuration based on the application of said rules and/or decisions by said rules/decisions module, wherein the reconfiguration of the second data cube from a first configuration to a second configuration is different than the reconfiguration of the first data cube from a first configuration to a second configuration.

7. The non-transitory computer-readable storage medium of claim 6, wherein said data cube usage data comprises actively used dimensions of said data cube at a particular point in time.

8. The non-transitory computer-readable storage medium of claim 6, wherein said business specific driver data includes data selected from the group consisting of peak hours data, off-peak hours data, particular dates data, particular days of the week data, holiday data, and business location data.

9. The non-transitory computer-readable storage medium of claim 6, further comprising program code for nullifying the identified dimensions while data aggregations are prepared and provided to a data mart within a data warehouse.

10. The non-transitory computer-readable storage medium of claim 6, further comprising program code for nullifying the identified dimensions while data aggregations are imported to said data cube outside of a data mart within a data warehouse.

* * * * *